Feb. 15, 1938.  W. R. PERRY  2,108,410
SPEED CONTROL MECHANISM
Filed March 28, 1932   2 Sheets-Sheet 1

INVENTOR.
William R. Perry
BY
Hood + Hahn
ATTORNEYS

Feb. 15, 1938.  W. R. PERRY  2,108,410
SPEED CONTROL MECHANISM
Filed March 28, 1932   2 Sheets-Sheet 2
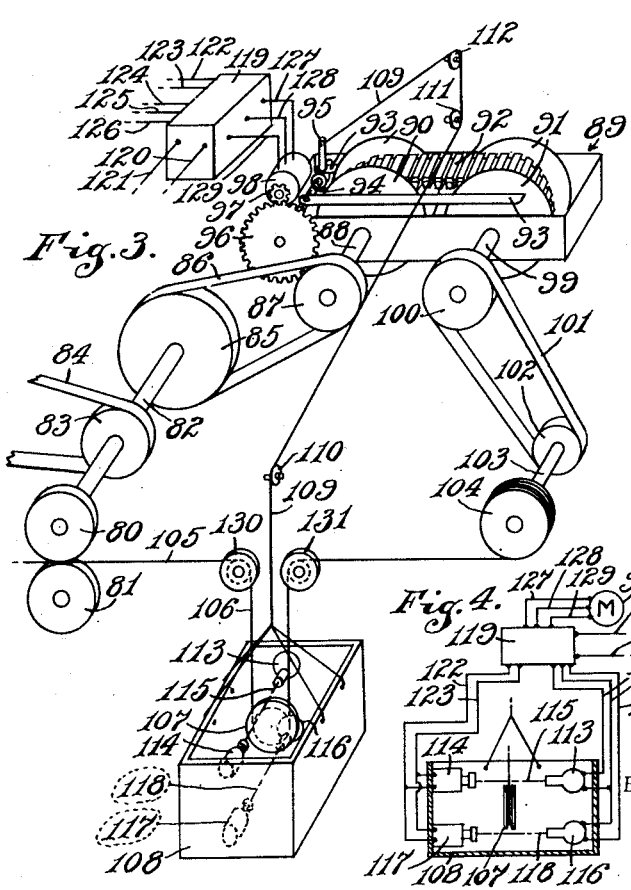
INVENTOR.
William R. Perry,
BY
Hood + Hahn.
ATTORNEYS Patented Feb. 15, 1938

2,108,410

UNITED STATES PATENT OFFICE 2,108,410

SPEED CONTROL MECHANISM

William R. Perry, Columbus, Ind., assignor to Reeves Pulley Company, Columbus, Ind., a corporation of Indiana Application March 28, 1932, Serial No. 601,606

13 Claims. (Cl. 242—45)

The present application relates to speed control mechanism, and more particularly to mechanism for controlling the speed of a driven element, such mechanism including light-sensitive means adapted to be dominated by a member associated with the driven element.

My invention may be embodied in many different forms, and I have herein illustrated several of them, but it is to be understood that I do not consider the specific form of any one of the mechanisms illustrated in the present application to be a limitation upon my invention. For instance, the specific control means of one illustrated embodiment of my invention might be applied to another illustrated embodiment without in any way violating the scope of my invention.

There are many circumstances, in industry, wherein it is desirable to control variably the speed of a driven element, the function of which element is to forward or to wind up a strand. In this connection, it is to be noted that, in the present application, I shall use the term "strand" in a broad enough sense to include either a string-like element or a web or strip or the like, the cross section of which may be of any form, so long as the material is flexible in a direction perpendicular to the direction of movement of the material. Where such a variable-speed drive is desired, it is necessary to provide variable-speed driving means, which may take the form of a variable-speed electric motor, a controlled internal combustion or steam engine, or any other desired driving means capable of driving at a plurality of desired speeds. I consider that my objects can be best accomplished through the use of a substantially constant speed prime mover connected to drive the variable-speed member through the medium of a variable-speed transmission, preferably of the well known "Reeves" type, and I have illustrated my invention in connection with that type of drive means, but attention is again called to the fact that my invention is not limited specifically to the use of that type of variable-speed driving means.

It is not unusual to control the out-put speed of a variable-speed transmission of this type through the medium of an idler resting upon a strand associated with the driven element, the speed of which is to be controlled, said idler being mechanically connected to the control member of the transmission. There are many industrial problems, however, in which the use of a control of this character is not feasible because the strand which is being handled is of insufficient tensile strength to operate the same, or for some other reason, and one important application of the present invention deals with the control of variable-speed driving means in circumstances of this sort.

Many other problems of control arise in industry which can not be solved by known means, but which are satisfactorily solved by the present invention. Not all of such problems are known to me, but the present disclosure will be such as to suggest quite clearly specific applications of the present invention to the solution of such problems.

Among the objects of the present invention are to provide means, independent of the tensile strength of the strand being handled, for controlling a variable-speed driving mechanism; to provide means immediately responsive to the slightest variation in demand to effect desired modification in speed of the driven member; and to provide means for controlling the speed of the variable-speed driving means in such a manner as to prevent "hunting".

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Fig. 3 is a diagrammatic isometric view of a second embodiment of my invention incorporated in winding mechanism;

Fig. 4 is a wiring diagram of the control illustrated in Fig. 3, the controlling carriage being shown in section;

Fig. 5 is a diagrammatic view of a portion of a further embodiment of my invention; and Fig. 6 is a diagrammatic view of a portion of still another embodiment of the present invention.

Figure 1:
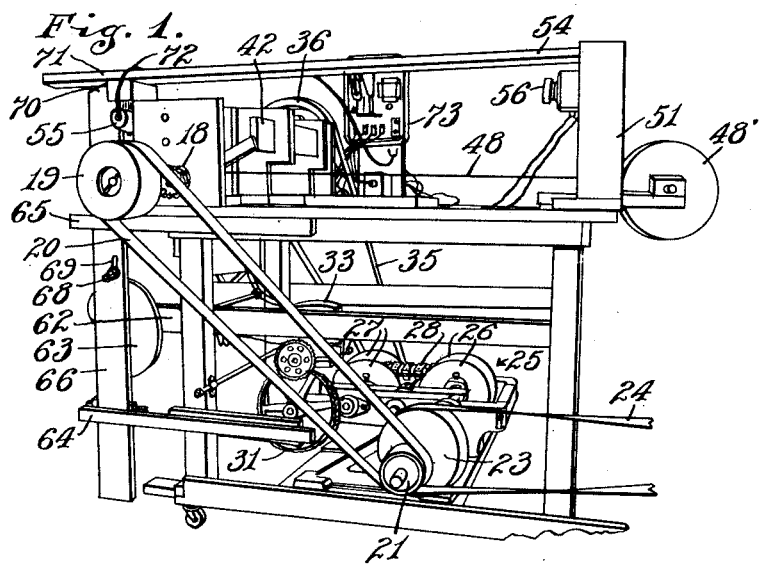
Fig. 1 is a perspective view of mechanism embodying my invention for spirally winding a strand upon a spindle.
Figure 2:
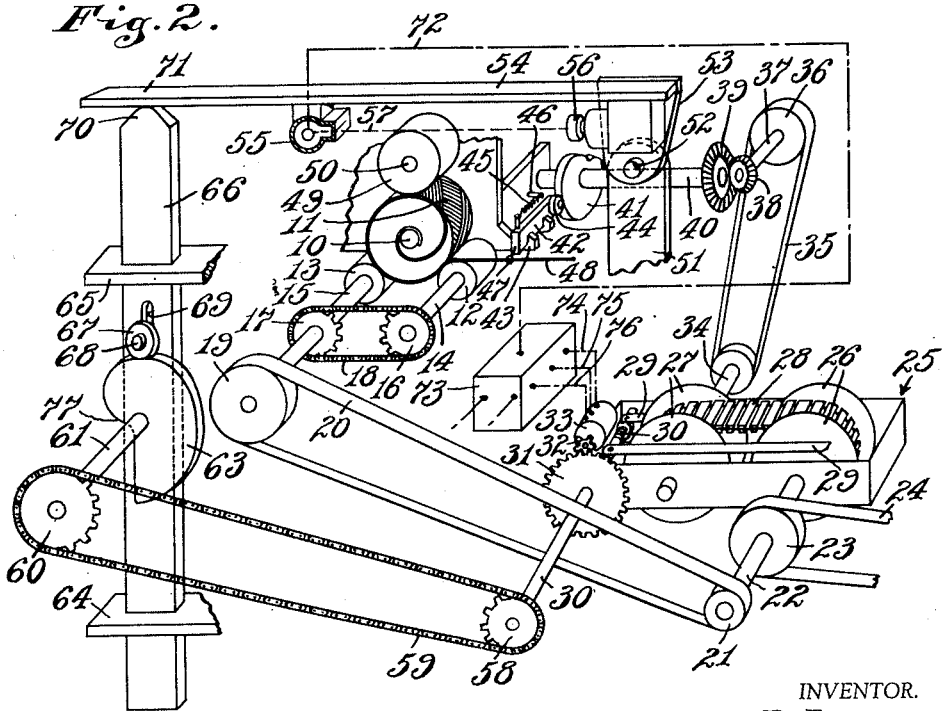
Fig. 2 is a diagrammatic isometric view of the same.

Referring, now, to Figs. 1 and 2, it will be seen that I have illustrated a spindle 10 upon which a strand is adapted to be wound in reverse helical form, as shown at 11.

The spindle 10 is supported upon and between a pair of rolls 12 and 13, said rolls being mounted respectively upon shafts 14 and 15, and said shafts carrying sprockets 16 and 17 connected by a chain 18, so that said shafts rotate in unison in the same direction, whereby the rolls 12 and 13 frictionally drive the spindle 10. The shaft 15 carries a pulley 19 which is driven, through a belt 20, from a pulley 21 on a shaft 22, said shaft carrying a second pulley 23 driven through a belt 24 by a prime mover (not shown). Said prime mover may be of a character to operate either at constant speed or at variable speeds.

The shaft 22 may be the in-put shaft of a variable-speed transmission indicated generally at 25, or it may be suitably operatively associated with the in-put shaft of said transmission. The in-put shaft of said transmission may carry a pair of cone discs 26, said transmission comprising a second pair of cone discs 27, and said discs 26 and 27 being connected by an edge-active belt 28 in the usual and well known manner. Said cone pairs 26 and 27 are adapted to be individually shifted toward and away from each other by control elements 29 operatively associated with a screw shaft 30. Said screw shaft 30 carries a gear 31 with which meshes a pinion 32 fast on the spindle of a reversible electric motor 33, whereby operation of said motor in either direction will effect movement of the control elements 29 to vary the speed of the out-put shaft 34 of the transmission upon which the cone pair 27 is mounted.

The shaft 34 carries a pulley which, through the medium of a belt 35, drives a pulley 36 upon a shaft 37, said shaft 37 carrying a bevel gear 38 meshing with a second bevel gear 39 upon a shaft 40. Said shaft 40 carries a heart-shaped cam 41 which engages a roller 44 upon a slide bar 42 suitably mounted as at 43 in the frame of the machine. A spring 45 is secured to said bar 42 and to a stationary pin 46, said spring being adapted to hold said roller 44 in contact with the cam 41.

The bar 42 carries a projecting member formed with an eye 47 through which the strand 48 is threaded.

In the drawings, there is illustrated for the sake of clarity, a spool 48' mounted upon the machine frame and carrying a supply of the strand material to be fed to the spindle 10. It will be readily understood, however, that, in practice, the strand material 48 will ordinarily be fed immediately from a machine in which it is fabricated or treated to the eye 47 and spindle 10, without the intermediation of a spool such as that illustrated at 48' in Fig. 1.

An idler cylinder 49 rests upon the spindle 10 or the material 11 thereon, said idler being provided with a pair of trunnions 50 engaged in vertical slots (not shown) in the machine frame. It will be obvious that, as the material 11 builds up upon the spindle 10, the idler 49 will be moved upwardly.

Adjacent the upper end of a frame element 51 there is provided a pivot pin 52 upon which is pivotally mounted a saddle 53 to which is secured an arm 54. Adjacent its outer end, said arm 54 carries a photo-electric cell 55, and adjacent its pivoted end, said arm carries a light source 56 positioned to direct a beam of light, indicated at 57, toward the cell 55.

The screw shaft 30, or a shaft operatively connected thereto, carries a sprocket 58 which is operatively connected, by a chain 59, with a sprocket 60 carried upon a shaft 61 journalled in an element 62 of the machine frame, said shaft 61 carrying a cam 63.

Two vertically spaced frame elements 64 and 65 are provided with registering slots in which is reciprocably mounted a post 66. A roller 67 is carried upon an axle 68 vertically adjustably mounted in an elongated slot 69 formed in said post 66, and said roller 67 rests upon the cam 63. The upper end 70 of said post 66 abuts and supports the free end 71 of the arm 54.

The wiring of the mechanism illustrated in Figs. 1 and 2 is only suggested, since the wiring arrangement is entirely conventional. A cable 72 extends from the control and amplifying unit 73 to the cell 55, and leads 74, 75 and 76 run from said control unit 73 to the motor 33, it being understood that said three leads provide two circuits whereby the motor 33 may be operated in opposite directions.

The control and amplifying unit is so connected that, so long as the beam 57 is unobstructed and is permitted to fall upon the cell 55, the motor 33 will not be operated. When, however, the beam is obstructed, the motor 33 will be energized to drive the shaft 30 in a direction to decrease the speed of the out-put shaft 34 of the transmission 25.

When an empty spindle 10 is placed upon the rolls 12 and 13, the parts are so positioned that the roller 67 rests substantially at the point 77 on the cam 63. The post 66 is thus at substantially its lower limit of movement, and the arm 54 inclines downwardly from its pivoted end. The parts are so proportioned that, under these circumstances, the beam 57 is substantially tangential with the upper surface of the cylinder 49, and is permitted to fall upon the cell 55. When the prime mover is started, the rolls 12 and 13 drive the spindle 10 to wind up the strand 48, the strand being drawn off of the spool 48'. The speed ratio between the shaft 22 and the shaft 34 is predetermined and is such as to cause the cam 41 to reciprocate the bar 42 at a speed such as to lay the strand 48 in the desired helix upon the spindle 10.

As the strand 48 is wound upon the spindle 10, it builds up thereon, thus increasing the effective diameter of the spindle 10, and elevating the cylinder 49. Almost immediately, the cylinder 49 will obstruct the ray 57, thus darkening the cell 55. Darkening of the cell 55 affects the amplifying and control unit 73 to energize the motor 33 to rotate the screw shaft 30, thus decreasing the speed of the out-put shaft 34 of the transmission 25, and correspondingly decreasing the rate of rotation of the cam 41, which, of course, results in a decrease in the rate of reciprocation of the bar 42. It will be obvious that, if the rate of reciprocation of bar 42 were not decreased, the pitch of the helix in which the strand 48 is laid upon the spindle 10 would be changed as the effective diameter of the spindle 10 increases, since such increase results in a decrease in the angular speed of the spindle 10, the rate of movement of the strand 48 being constant. The decrease in speed of the shaft 34 compensates for this decrease in the angular speed of the spindle 10.

As the shaft 30 is rotated to decrease the speed of the shaft 34, the sprocket 58 is likewise rotated to drive the sprocket 60 and shaft 61 to shift the cam 63, whereby, through the medium of the roller 67, the post 66 is lifted. The motor 33 will continue to drive the shaft 30 until such time as the post 66 is lifted sufficiently to move the bar 54 to a position in which the beam 57 comes again into tangential relation with the upper surface of the roll 49, whereupon the cell 55 is again illuminated and the motor 33 is deenergized.

The shape of the cam 63 is, of course, important. It is well known that a given number of revolutions of screw shaft 30 will result in different ratios of speed changes, depending upon the starting ratio between the speed of the shaft 22 and the shaft 34. It is also obvious that, as the diameter of the spindle 10 and the material 11 increases, the curve representing the decrease in angular speed of said spindle, per unit of material added to the spindle, will not be a straight line, since the center of the spindle 10 will be elevated at a rate not directly proportional to the rate of addition of material to said spindle. The cam 63 must, therefore, be proportioned to compensate for both of these variations.

Suitable means (not shown) such as a hand switch may be provided for reversing the motor 33 to return the elements 29 and the cam 63 to initial positions after one spindle 10 has been filled, and when an empty spindle is substituted therefor.

The device of Figs. 3 and 4 is likewise a winding device, and it is similar to the device of Fig. 1 in that the light-sensitive means is mounted upon a carriage which is movable to compensate for movement of the strand-responsive means, by the shifter mechanism of the variable-speed means. The device comprises a pair of forwarding or feed rolls 80 and 81 between which the strand 105 is received and which may be the discharge rolls of a fabricating or treating machine. The roll 80 is mounted upon, or otherwise driven by, a shaft 82 upon which is likewise mounted a pulley 83 adapted to be driven, through a belt 84 or other means, by a prime mover (not shown). The shaft 82 may likewise carry a further pulley 85 which, through the medium of a belt 86 or the like drives a pulley 87 on the in-put shaft 88 of a variable-speed transmission indicated generally at 89. The transmission comprises a pair of cone discs 90 mounted upon the shaft 88, and a second pair of cone discs 91, a belt 92 connecting said discs 90 and 91. The discs 90 and 91 are adapted to be shifted by control elements 93, said elements being actuable by a screw shaft 94, and one of said elements carrying an upstanding pin 95. The screw shaft 94 carries a gear 96 with which meshes a pinion 97 mounted upon the spindle of a reversible electric motor 98.

The discs 91 are mounted upon the variable-speed, or out-put, shaft 99, said shaft carrying a pulley 100 which, through the medium of a belt 101, drives a pulley 102 upon a shaft 103 upon which is mounted a winding reel 104.

The strand 105 is threaded between the rolls 80 and 81, over a sheave 130 and a second sheave 131, and onto the reel 104, the strand being so arranged that a bight 106 depends between the sheaves 130 and 131. A grooved roll 107 is supported in the bight 106, the strand being received in the groove of said roll, whereby the roll is supported.

In the present embodiment, the carriage for the light-responsive means comprises a box or casing 108 supported upon a cable 109 which passes over a pulley 110, under a pulley 111, over a pulley 112, and is connected to the pin 95. A photo-electric cell 113 is mounted at one end of the carriage 108, and a light source 114 is mounted at the opposite end of said carriage, said light source being positioned to direct a beam 115 toward the cell 113. A second photo-electric cell 116 is mounted vertically beneath the cell 113 in the carriage 108, and a second light source 117 is mounted vertically beneath the light source 114 to direct a beam 118 toward the cell 116.

An amplifying and controlling unit is illustrated at 119, and a supply line, constituting the wires 120 and 121, is suitably connected to said unit. A pair of wires 122 and 123 connect the light sources 114 and 117 in parallel to the supply line through the control unit, whereby said light sources may be energized. Wires 124, 125, and 126 connect the electrodes of the respective cells 113 and 116 to the control unit 119, and wires 127, 128, and 129 are connected to the motor 98 to supply current thereto to drive the motor in one direction or the other.

The arrangement is such that, so long as both of the cells 113 and 116 are illuminated, the motor 98 will not be energized but, if the beam 115 is obstructed, the motor 98 will be energized to reduce the angular velocity of the shaft 99, and thus to reduce the angular velocity of the shaft 103; while, if the beam 118 is obstructed, the motor 98 will be energized to rotate in the opposite direction to increase the angular velocity of the shafts 99 and 103.

To begin winding, the apparatus is set up in the manner illustrated. Initially, the shaft 103 may be rotated at an angular velocity greater than the angular velocity of the shaft 82. As the strand 105 begins to build up material on the reel 104, the peripheral velocity of the surface of the reel of material will be increased, whereby the bight 106 will be shortened. As the bight 106 is shortened, the beam 115 is obstructed to darken the cell 113 whereby the motor 98 is energized to reduce the angular velocity of the shafts 99 and 103. Such operation of the motor shifts the elements 93, whereby the pin 95 is moved to elevate the carriage 108, through the medium of the cable 109, to bring the cell 113 and light source 114 to a position at which the beam 115 is unobstructed. If, by any chance, the motor 98 should overrun, the beam 118 would be obstructed, whereupon the motor would be operated in the opposite direction and the carriage 108 would be dropped slightly to a position at which both beams 115 and 118 are unobstructed. Similarly, if, for any reason, the bight 106 should be lengthened during the operation of the apparatus, the roll 107 would be lowered into the path of the beam 118, thus darkening the cell 116, whereupon motor 98 would be operated to increase the angular velocity of the shafts 99 and 103. Such operation of the motor would drop the carriage 108 to a point at which, again, neither beam is obstructed.

Figs. 5 and 6 illustrate simply specific modes of associating the photo-electric cells and light sources with the material being forwarded. In Fig. 5, there is shown a web 215 supported upon rolls 216 and 217 in such a manner as to permit a bight 218 to depend therebetween. A light source 219 is disposed to direct a beam 220 between the sides of the bight 218, and at an angle to the plane of the bottom of said bight, toward a photo-electric cell 221. A second light source 222 is arranged to direct a beam 223 beneath the bottom of said bight, toward a photo-electric cell 224. Obviously, as the bight 218 is shortened the edge 226 of the bottom of said bight will intercept the beam 220; and as the bight is lengthened, the bottom of said bight will intercept the beam 223.

It will also be obvious that the light sources and photo-electric cells may be mounted upon a movable carriage if compensated control is desired.

In Fig. 6, there is illustrated a strand 230 supported upon a pair of rolls 231 and 232 and arranged to provide a depending bight 233 between said rolls. A photo-electric cell housing 234 having an aperture 235 therein is positioned immediately above the normal position of the bottom of the bight 233, and a second photo-electric cell housing 236 having an aperture 237 is positioned immediately below the normal position of the bottom of the bight 233. A light source (not shown) is spaced from said housings by the bight 233, said source directing light beams toward said apertures 235 and 237. In this arrangement, the strand 230 is not capable of completely intercepting the light beams, but it can obstruct such beams to reduce the amount of light which falls upon either one of the two photo-electric cells. Even such partial obstruction will cause a sufficient variation in the resistance of the cell to current flow to permit the use of such partial obstruction to control variable-speed forwarding or winding mechanism.

I claim as my invention:

1. In combination, material feeding means, material take-up means, mechanism including a variable speed transmission connected to drive one of said means, means for varying the output speed of said transmission, light-sensitive means connected to control said speed varying means to vary the angular velocity of said variably-driven means, and means operated by said speed varying means for moving said light-sensitive means.

2. In combination, a rotatable member, a rotatable element, means including a variable-speed transmission connected to drive said rotatable element, and light-sensitive means connected to control said variable-speed transmission to bring said rotatable element to a velocity constantly proportional to the velocity of said rotatable member, said means comprising electrical means for controlling said variable-speed transmission, a photo-electric cell dominating said electrical means, a light source, and a single member dominated by said rotatable element and operable alone, at times, to obstruct the light from said source directed toward said cell, and means operated by said electrical means for moving said photo-electric cell to a new position.

3. Strand handling means comprising a take-up member, means for driving said take-up member comprising a variable-speed transmission and an electric motor operable to vary the output speed of said transmission, a portion of the strand handled by said member normally hanging as a bight in advance of said take-up member, a photo-electric cell disposed adjacent said bight, a light source spaced from said cell by said bight, and directed toward said cell, and connections between said cell and said motor whereby, when said bight is shortened to obstruct the light from said source falling upon said cell, said motor is operated to reduce the output speed of said transmission.

4. Web forwarding means comprising a roll, means for driving said roll, a second roll, variable-speed means for driving said second roll, a web associated with said rolls and having a portion intermediate said rolls depending to form a bight, a first photo-electric cell, a light source for said cell adapted, when the bottom of said bight is normally positioned with respect thereto, to project a light beam between the sides of said bight upon said first cell, a second photo-electric cell, a light source for said second cell adapted, when the bottom of said bight is normally positioned with respect thereto, to project a light beam beneath the bottom of said bight upon said second cell, and connections between said cells and said variable-speed means whereby, when said bight is shortened and said first cell is consequently shielded from its light source, said variable-speed mechanism is operated to decrease the speed of said second roll, and when said bight is lengthened, and said second cell is consequently shielded from its light source, said variable-speed mechanism is operated to increase the speed of said second roll.

5. In combination, a shaft, means for driving said shaft, a second shaft, variable-speed means for driving said second shaft, an element associated with said shafts and movable in response to continued rotation of said shafts, and means for varying the out-put speed of said variable-speed means, comprising a carriage, a photo-electric cell mounted on said carriage, a light-source likewise mounted on said carriage and directing a beam of light toward said cell, said element, upon such movement, intercepting said beam, connections between said cell and said variable-speed means whereby, when said beam is intercepted, the out-put speed of said variable-speed means is changed, and means associated with said variable-speed means and said carriage to move said carriage, upon variation of out-put speed of said variable-speed means, to shift said light source and cell to a position wherein said element is out of the path of said beam.

6. In combination, a shaft, means for driving said shaft, a second shaft, a variable-speed transmission connected to drive said second shaft at variable speeds, an electric motor connected to shift the elements of said transmission to vary the out-put speed of said transmission, an element associated with said shafts and movable in response to continued rotation of said shafts, and means for varying the out-put speed of said transmission, said means comprising a carriage, a photo-electric cell mounted on said carriage, a light-source likewise mounted on said carriage and directing a beam of light toward said cell, said element, upon such movement, intercepting said beam, connections between said cell and said motor whereby, when said beam is intercepted, said motor is energized to vary the out-put speed of said transmission, and means driven by said motor to shift said carriage to move said light source and cell to a position wherein said element is out of the path of said beam.

7. In combination, a feed-roll, means for driving said feed roll, a wind-up roll, variable-speed means for driving said wind-up roll, a strand extending between said rolls and having a portion thereof forming a bight, an element received in said bight, a carriage, a photo-electric cell mounted on said carriage, a light source likewise mounted on said carriage and directing a beam of light toward said cell, said cell and light source being positioned on opposite sides of said element whereby, as said bight is shortened, said element is moved by said bight to intercept said beam, connections between said cell and said variable-speed means whereby, when said beam is intercepted, said variable-speed means is operated to reduce the speed of said wind-up roll, and means operatively connecting said variable-speed means and said carriage and operable, when said beam is intercepted, to shift said carriage to move said cell and light source to a position wherein said element is out of the path of said beam.

8. In combination, a feed-roll, means for driving said feed roll, a wind-up roll, variable-speed means for driving said wind-up roll, a strand extending between said rolls and having a portion thereof forming a bight, an element received in said bight, a carriage, two vertically spaced photo-electric cells mounted on said carriage, means mounted on said carriage and directing light beams toward said cells, said light-directing means and said cells being positioned on opposite sides of said element whereby, as said bight is shortened, said element is moved by said bight to shield one of said cells from said beams, and as said bight is lengthened, said element is moved to shield the other of said cells from said beams, connections between said cells and said variable-speed means whereby, when said first cell is shielded, said variable-speed means is operated to reduce the speed of said wind-up roll, and when said second cell is shielded, said variable-speed means is operated to increase the speed of said wind-up roll, and means operatively connecting said variable-speed means and said carriage and operable, when either of said cells is shielded, to shift said carriage to move said cells and light-directing means to a position in which neither cell is shielded.

9. A strand-winding machine comprising a strand wind-up roll, means for driving said roll, means for feeding a strand to said roll, a reciprocable element engaging said strand to shift the same longitudinally of said wind-up roll as said wind-up roll rotates, rotatable means for driving said reciprocable element, variable-speed means for driving said rotatable means, a shiftable carriage, a photo-electric cell mounted on said carriage, a light source likewise mounted on said carriage and directing a beam of light toward said cell, said carriage being associated with said wind-up roll whereby, as the diameter of said wind-up roll increases, said beam is intercepted, connections between said cell and said variable-speed means whereby, when said beam is intercepted, said variable-speed means is operated to vary the speed of said rotatable means, and means operatively connecting said carriage and said variable-speed means and operable, when said beam is intercepted, to shift said carriage to move said light source and cell into a position wherein said beam is unobstructed.

10. A strand-winding machine comprising a strand wind-up roll, means for driving said roll, means for feeding a strand to said roll, a reciprocable element engaging said strand to shift the same longitudinally of said wind-up roll as said wind-up roll rotates, rotatable means for driving said reciprocable element, a variable-speed transmission connected to drive said rotatable means at variable speeds, an electric motor connected to shift the elements of said transmission to vary the out-put speed thereof, a shiftable carriage, a photo-electric cell mounted on said carriage, a light source likewise mounted on said carriage and directing a beam of light toward said cell, said carriage being associated with said wind-up roll whereby, as the diameter of said wind-up roll increases, said beam is intercepted, connections between said cell and said motor whereby, when said beam is intercepted, said motor is energized to shift said transmission elements to vary the speed of said rotatable means, and means driven by said motor to shift said carriage to move said light source and cell into a position wherein said beam is unobstructed.

11. Web forwarding means comprising a roll, means for driving said roll, a second roll, a variable-speed transmission for driving said second roll, an electric motor operable to vary the output speed of said transmission, a web associated with said rolls and having a portion intermediate said rolls depending to form a bight, a first photo-electric cell, a light source for said cell adapted, when the bottom of said bight is normally positioned with respect thereto, to project a light beam between the sides of said bight upon said first cell, a second photo-electric cell, a light source for said second cell adapted, when the bottom of said bight is normally positioned with respect thereto, to project a light beam beneath the bottom of said bight upon said second cell, and connections between said cells and said variable-speed means whereby, when said bight is shortened and said first cell is consequently shielded from its light source, said motor is operated to decrease the speed of said second roll, and when said bight is lengthened, and said second cell is consequently shielded from its light source, said motor is operated to increase the speed of said second roll.

12. In combination, a first web-propelling means, a second web-propelling means, a variable-speed transmission operatively connected to drive said second web-propelling means, and light-sensitive means connected to control said variable-speed transmission to vary the speed thereof in either direction to bring said second web-propelling means to a velocity substantially equal to the velocity of said first web-propelling means, said light-sensitive means including two photoelectric cells, means for directing light toward said cells, a reversible electric motor dominating said transmission and under the control of said cells, means shiftable oppositely to change the intensity of light falling upon said respective cells from said light-directing means to cause energization of said motor to vary the output speed of said transmission in one direction or the other, and means automatically operable to deenergize said motor without affecting said shiftable means, while leaving said light-sensitive means in condition to vary subsequently the speed of said transmission in either direction.

13. In combination, two rotatable elements, means including a variable speed transmission for driving one of said rotatable elements at variable speeds, a member movable to vary the output speed of said transmission, an electric motor operable to move said member, and a control for said motor comprising a photoelectric cell, a light source associated with said cell, electrical connections between said cell and said motor, means shiftable in response to a variation in speed of said variably driven element to change the intensity of the light falling upon said cell from said source to cause energization of said motor, and means automatically operable to deenergize said motor without affecting said shiftable means, while leaving said control in condition for subsequent further operation to energize said motor in the same direction.

WILLIAM R. PERRY.